(12) United States Patent
Hamlin

(10) Patent No.: US 7,003,674 B1
(45) Date of Patent: Feb. 21, 2006

(54) DISK DRIVE EMPLOYING A DISK WITH A PRISTINE AREA FOR STORING ENCRYPTED DATA ACCESSIBLE ONLY BY TRUSTED DEVICES OR CLIENTS TO FACILITATE SECURE NETWORK COMMUNICATIONS

(75) Inventor: Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 935 days.

(21) Appl. No.: 09/630,256

(22) Filed: Jul. 31, 2000

(51) Int. Cl.
*G06F 12/14* (2006.01)
*G06F 13/28* (2006.01)
*G11B 3/90* (2006.01)
*G11B 5/09* (2006.01)

(52) U.S. Cl. .................. 713/193; 369/17; 369/133; 369/174; 360/27; 711/112; 713/200

(58) Field of Classification Search ................ 713/165, 713/172–174, 182, 183, 185, 189–200; 711/111, 711/112–114; 360/27; 369/17, 133, 174
See application file for complete search history.

(56) References Cited

U.S. PATENT DOCUMENTS

| | | | | |
|---|---|---|---|---|
| 4,757,534 A | * | 7/1988 | Matyas et al. ................. | 705/56 |
| 5,235,641 A | * | 8/1993 | Nozawa et al. .............. | 713/193 |
| 5,463,690 A | | 10/1995 | Crandall ....................... | 380/30 |
| 5,465,183 A | * | 11/1995 | Hattori ..................... | 360/78.09 |
| 5,583,712 A | * | 12/1996 | Brunelle ................... | 360/77.07 |
| 5,592,555 A | | 1/1997 | Stewart | |
| 5,657,470 A | * | 8/1997 | Fisherman et al. ......... | 711/153 |
| 5,677,952 A | * | 10/1997 | Blakley et al. ............. | 713/189 |
| 5,687,237 A | | 11/1997 | Naclerio | |
| 5,805,699 A | | 9/1998 | Akiyama et al. ............. | 705/58 |
| 5,883,958 A | | 3/1999 | Ishiguro et al. | |
| 5,915,018 A | * | 6/1999 | Aucsmith .................... | 380/201 |
| 5,923,754 A | | 7/1999 | Angelo et al. ................ | 705/54 |
| 5,930,358 A | * | 7/1999 | Rao ........................... | 713/193 |
| 5,931,947 A | | 8/1999 | Burns et al. | |
| 5,995,624 A | | 11/1999 | Fielder et al. .............. | 713/169 |
| 6,061,794 A | | 5/2000 | Angelo et al. ............. | 713/200 |
| 6,064,989 A | | 5/2000 | Cordery et al. ............... | 705/50 |

(Continued)

FOREIGN PATENT DOCUMENTS

EP           816967 A2 *   1/1998

(Continued)

OTHER PUBLICATIONS

Mirosoft, Computer Dictionary, 5th Edition, 2002, p. 165.*

(Continued)

*Primary Examiner*—Gregory Morse
*Assistant Examiner*—Matthew Heneghan
(74) *Attorney, Agent, or Firm*—Howard H. Sheerin, Esq.

(57) ABSTRACT

A disk drive is disclosed comprising a disk for storing data, the disk comprising a public area for storing plaintext data and a pristine area for storing encrypted data. The disk drive comprises a head for reading the encrypted data from the pristine area of the disk, and a control system for controlling access to the pristine area of the disk. Authentication circuitry within the disk drive is provided for authenticating a request received from an external entity to access the pristine area of the disk and for enabling the control system if the request is authenticated. The disk drive further comprises a secret drive key, and decryption circuitry responsive to the secret drive key, for decrypting the encrypted data stored in the pristine area of the disk.

26 Claims, 4 Drawing Sheets

U.S. PATENT DOCUMENTS

| | | | | |
|---|---|---|---|---|
| 6,085,320 | A | 7/2000 | Kaliski, Jr. | 713/168 |
| 6,144,743 | A | 11/2000 | Yamada et al. | 380/44 |
| 6,189,098 | B1 | 2/2001 | Kaliski, Jr. | 713/168 |
| 6,226,750 | B1 | 5/2001 | Trieger | 713/201 |
| 6,230,269 | B1 | 5/2001 | Spies et al. | 713/182 |
| 6,253,323 | B1 | 6/2001 | Cox et al. | 713/176 |
| 6,289,102 | B1 | 9/2001 | Ueda et al. | 380/201 |
| 6,289,451 | B1 | 9/2001 | Dice | 713/168 |
| 6,289,457 | B1 | 9/2001 | Bishop et al. | 713/200 |
| 6,363,487 | B1 * | 3/2002 | Schneider | 713/200 |
| 6,397,333 | B1 | 5/2002 | Sohne et al. | 713/176 |
| 6,405,315 | B1 | 6/2002 | Burns et al. | 713/190 |
| 6,434,700 | B1 | 8/2002 | Alonso et al. | 713/169 |
| 6,438,235 | B1 | 8/2002 | Sims, III | 380/285 |
| 6,473,809 | B1 | 10/2002 | Aref et al. | 710/6 |
| 6,473,861 | B1 * | 10/2002 | Stokes | 713/193 |
| 6,550,009 | B1 | 4/2003 | Uranaka et al. | 713/168 |
| 6,609,199 | B1 | 8/2003 | DeTreville | 713/172 |
| 6,615,264 | B1 | 9/2003 | Stoltz et al. | 709/227 |
| 6,823,398 | B1 * | 11/2004 | Lee et al. | 710/5 |
| 2001/0032088 | A1 | 10/2001 | Utsumi | 705/1 |
| 2003/0191816 | A1 | 10/2003 | Landress et al. | 709/219 |

FOREIGN PATENT DOCUMENTS

| | | |
|---|---|---|
| EP | 0911738 A2 | 4/1998 |

OTHER PUBLICATIONS

Bertino et al., Advanced Transaction Processing in Multi-level Secure File Stores, 1998, IEEE 1041-4247/98.*

Menezes et al. Handbook of Applied Cryptography, 1997, CRC Press, p. 171, 357-358.*

Menezes, "Handbook of Applied Cryptography," 1997, pp. 500-501.*

William Stallings, "Cryptography and Network Security, Principles and Practice", Second Edition, Prentice Hall, Inc. ISBN 0-13-869017-0, pp. 323-353, Jul. 1996.

Bennett Yee, J.D. Tygar, "Secure Coprocessors in Electronic Commerce Applications", First USENIX Workshop on Electronic Commerce, Jul. 11-12, 1995, 155-170.

Howard Gobioff, "Security for a High Performance Commodity Storage Subsystem", School of Computer Science, Carnegie Mellon University, CMU-CS-99-160, Jul. 1999, pp. 171-178.

Rodney Van Meter, Steve Hotz, Gregory Finn, "Derived Virtual Devices: A Secure Distributed File System Mechanism", In Proceedings of the Fifth NASA Goddard Space Flight Center Conference on Mass Storage Systems and Technologies, Sep. 1996.

Garth A. Gibson, David F. Nagle, Khalil Amiri, Fay W. Chang, Howard Gobioff, Erik Riedel, David Rochberg, and Jim Zelenka, "Filesystems for Network-Attached Secure Disks", Jul. 1997, 1-18, CMU-CS-97-118, School of Computer Science, Carnegie Mellen University, Pittsburgh, Pennsylvania 15213-3890.

Howard Gobioff, Garth Gibson, and Doug Tygar, "Security for Network Attached Storage Devices", Oct. 23, 1997, 1-18, CMU-CS-97-185, School of Computer Science, Carnegie Mellen University, Pittsburgh, PA 15213.

"Digitial Transmission Licience Agreement", www.dtcp.com.

"Digitial Transmission Content Protection Specification", vol. 1, Revision 1.0, Apr. 12, 1999, www.dtcp.com.

"5C Digital Transmission Content Protection White Paper", Revision 1.0, Jul. 14, 1998, www.dtcp.com.

Steve Grossman, "Two-Chip Set Safeguards Digital Video Content", Electronic Design, Jun. 12, 2000, pp. 68-72.

* cited by examiner

| | 1 | 2 | 3 | 4 | 5 | 6 | 7 | 8 | 9 |
|---|---|---|---|---|---|---|---|---|---|
| 0 | 1 | 2 | 3 | 4 | 5 | 6 | 7 | 8 | 9 |
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |
| 80 | 81 | 82 | 83 | 84 | 85 | 86 | 87 | 88 | 89 |
| 90 | 91 | 92 | 93 | 94 | 95 | 96 | 97 | 98 | 99 |
| 100 | 101 | 102 | 103 | 104 | 105 | 106 | 107 | 108 | 109 |
| 110 | 111 | 113 | 114 | 115 | 116 | 117 | 118 | 119 | 120 |
| 120 | 121 | 122 | 123 | 124 | 125 | 126 | 127 | 128 | 129 |
| 130 | 131 | 132 | 133 | 134 | 135 | 136 | 137 | 138 | 139 |
| 140 | 141 | 142 | 143 | 144 | 145 | 146 | 147 | 148 | 149 |

Columns 0–3: EXTERNALLY INACCESSIBLE (cols 0–2 PRISTINE AREA); columns 3–9: EXTERNALLY ACCESSIBLE; rows 30+: PUBLIC AREA.

FIG. 4

DISK DRIVE EMPLOYING A DISK WITH A PRISTINE AREA FOR STORING ENCRYPTED DATA ACCESSIBLE ONLY BY TRUSTED DEVICES OR CLIENTS TO FACILITATE SECURE NETWORK COMMUNICATIONS

CROSS-REFERENCE TO RELATED PATENTS AND APPLICATIONS

This patent application is related to other co-pending U.S. patent applications. Namely, U.S. patent application Ser. No. 09/608,103 entitled "SECURE DISK DRIVE COMPRISING A SECURE DRIVE KEY AND A DRIVE ID FOR IMPLEMENTING SECURE COMMUNICATION OVER A PUBLIC NETWORK," and Ser. No. 09/608,102 entitled "DISK DRIVE IMPLEMENTING KEY MANAGEMENT FOR GENERATING AND DECOMMISSIONING CLIENT KEYS SUPPLIED TO CLIENT COMPUTERS TO FACILITATE SECURE COMMUNICATION OVER A PUBLIC NETWORK."

BACKGROUND OF THE INVENTION

1. Field of the Invention

The present invention relates to disk drives for computer systems. More particularly, the present invention relates to a disk drive employing a disk with a pristine area for storing encrypted data accessible only by trusted devices or clients to facilitate secure network communications.

2. Description of the Prior Art

Cryptography for secure network communications is typically implemented by server and client computers attached to a network. With Internet communications, for example, cryptography is typically implemented by the server computers hosting secure web sites and the browser programs running on client computers. A secure communication protocol, such as the Secure Socket Layer (SSL), is used to transmit encrypted messages over public lines subject to inspection. If an encrypted message is intercepted while in transit, it is extremely difficult to decipher the message without the cryptographic key. For this reason, attackers are focusing their efforts on the computers which implement the cryptography algorithms in an attempt to glean information about the secret cryptographic keys used for the authentication and the encryption/decryption operations. The attacks may be physical using debuggers and logic analyzers, or they may be remote attacks using virus programs which invade the computer's operating system in order to obtain information concerning the cryptographic keys. A virus may, for example, be introduced remotely into a computer's operating system by attaching the virus to an email.

A paper by H. Gobioff, G. Gibson, and D. Tygar entitled "Security for Network Attached Storage Devices", Oct. 23, 1997, School of Computer Science, Carnegie Mellon University, suggests to implement cryptography algorithms and secret keys in tamper resistant circuitry within a disk drive where it is less susceptible to probing and virus attacks. These types of disk drives, referred to as NASD disk drives, are intended to be attached directly to a network in order to avoid the overhead associated with an intervening file server. However, the above referenced paper does not disclose many details of implementation, particularly with respect to the authentication and encryption/decryption operations.

The Digital Transmission Content Specification or DTCP (available through the Internet at http://www.dtcp.com) discloses a cryptographic protocol for protecting audio/video (A/V) content from unauthorized copying as it traverses digital transmission mechanisms from device to device. Only compliant devices manufactured to support the DTCP protocol are capable of transmitting or receiving the protected A/V content. Each device is manufactured with a unique device ID and a public/private key pair which facilitate authentication and encryption/decryption of the A/V content. The DTCP specification suggests to store the private key in a way so as to prevent its disclosure, however, no specific means are disclosed for achieving this objective.

U.S. Pat. No. 5,931,947 discloses a network storage device for use in a secure array of such devices to support a distributed file system. Each device is an independent repository of remotely encrypted data to be accessed by authorized network clients. All encryption is done by the clients, rather than by the devices, and the encrypted data is stored in encrypted form. Each network storage device comprises an owner key used to generate authentication keys within the device for authenticating messages received from the clients. However, the keys used by the clients for encrypting data and generating the message authentication codes are generated external to the devices by a system administrator which is susceptible to attack. Further, the aforementioned patent does not disclose any details concerning the privacy of the owner key within each disk drive.

U.S. Pat. No. 5,687,237 discloses an encryption key management system for an integrated circuit which encrypts or decrypts data received from a microcontroller. The encryption and decryption operations are implemented using cryptographic keys stored in a non-volatile memory in encrypted form to protect against discovery. When needed to encrypt or decrypt data, the integrated circuit employs a secret internal key to decrypt the cryptographic keys stored in the non-volatile memory. Although storing the cryptographic keys in encrypted form protects against discovery, the aforementioned patent does not disclose any details concerning the authentication of users or devices requesting the encryption or decryption operations, nor does it disclose any details concerning the authentication of messages to verify that the messages have not been modified while in transit over public lines.

There is, therefore, the need to improve security in network communications, particularly with respect to probing attacks and virus attacks on computer operating systems.

SUMMARY OF THE INVENTION

The present invention may be regarded as a disk drive comprising a disk for storing data, the disk comprising a public area for storing plaintext data and a pristine area for storing encrypted data. The disk drive comprises a head for reading the encrypted data from the pristine area of the disk, and a control system for controlling access to the pristine area of the disk. Authentication circuitry within the disk drive is provided for authenticating a request received from an external entity to access the pristine area of the disk and for enabling the control system if the request is authenticated. The disk drive further comprises a secret drive key, and decryption circuitry responsive to the secret drive key, for decrypting the encrypted data stored in the pristine area of the disk.

The present invention may also be regarded as a disk drive comprising a disk for storing data, the disk comprising a public area for storing plaintext data and a pristine area for storing encrypted data. The disk drive comprises a head for reading data from the disk, and a control system for controlling access to the disk. The disk drive further comprises a secret drive key, and decryption circuitry responsive to the secret drive key, for decrypting the encrypted data stored in the pristine area of the disk to generate decrypted data. The decrypted data is processed by authentication circuitry within the disk drive for authenticating a request received from an external entity to access the disk and for enabling the control system if the request is authenticated.

The present invention may also be regarded as a disk drive comprising a disk for storing data, the disk comprising a public area for storing plaintext data and a pristine area for storing encrypted data. The disk drive comprises a head for reading the encrypted data from the pristine area of the disk, and a control system for controlling access to the pristine area of the disk. The disk drive further comprises a secret drive key, and decryption circuitry responsive to the secret drive key, for decrypting the encrypted data stored in the pristine area of the disk. The disk comprises a plurality of physical blocks accessed by the control system through physical block addresses. An access request received from an external entity during normal operation of the disk drive comprises a logical block address which is mapped by the control system to a selected one of the physical block addresses. The pristine area comprises at least one physical block written with at least part of the encrypted data during manufacturing of the disk drive and not externally accessible through a logical block address during normal operation of the disk drive.

The present invention may also be regarded as a method of processing a request received by a disk drive from an external entity to access encrypted data stored in a pristine area of a disk. The method comprises the steps of authenticating the request to access the pristine area and enabling access to the pristine area if the request is authenticated, reading the encrypted data stored in the pristine area, and decrypting the encrypted data using a secret drive key within the disk drive to generate decrypted data.

The present invention may also be regarded as a method of processing a request received by a disk drive from an external entity to access data stored on a disk, the disk comprising a public area for storing plaintext data and a pristine area for storing encrypted data. The method comprises the steps of decrypting the encrypted data stored in the pristine area of the disk using a secret drive key within the disk drive to generate decrypted data, and using the decrypted data to authenticate the request received from the external entity before allowing access to the disk.

BRIEF DESCRIPTION OF THE DRAWINGS

FIG. 4 shows a disk format according to an embodiment of the present invention as comprising a plurality of physical blocks in the pristine area which are written with encrypted data during manufacturing and are not externally accessible during normal operation of the disk drive.

DESCRIPTION OF THE PREFERRED EMBODIMENTS

Figure 1:
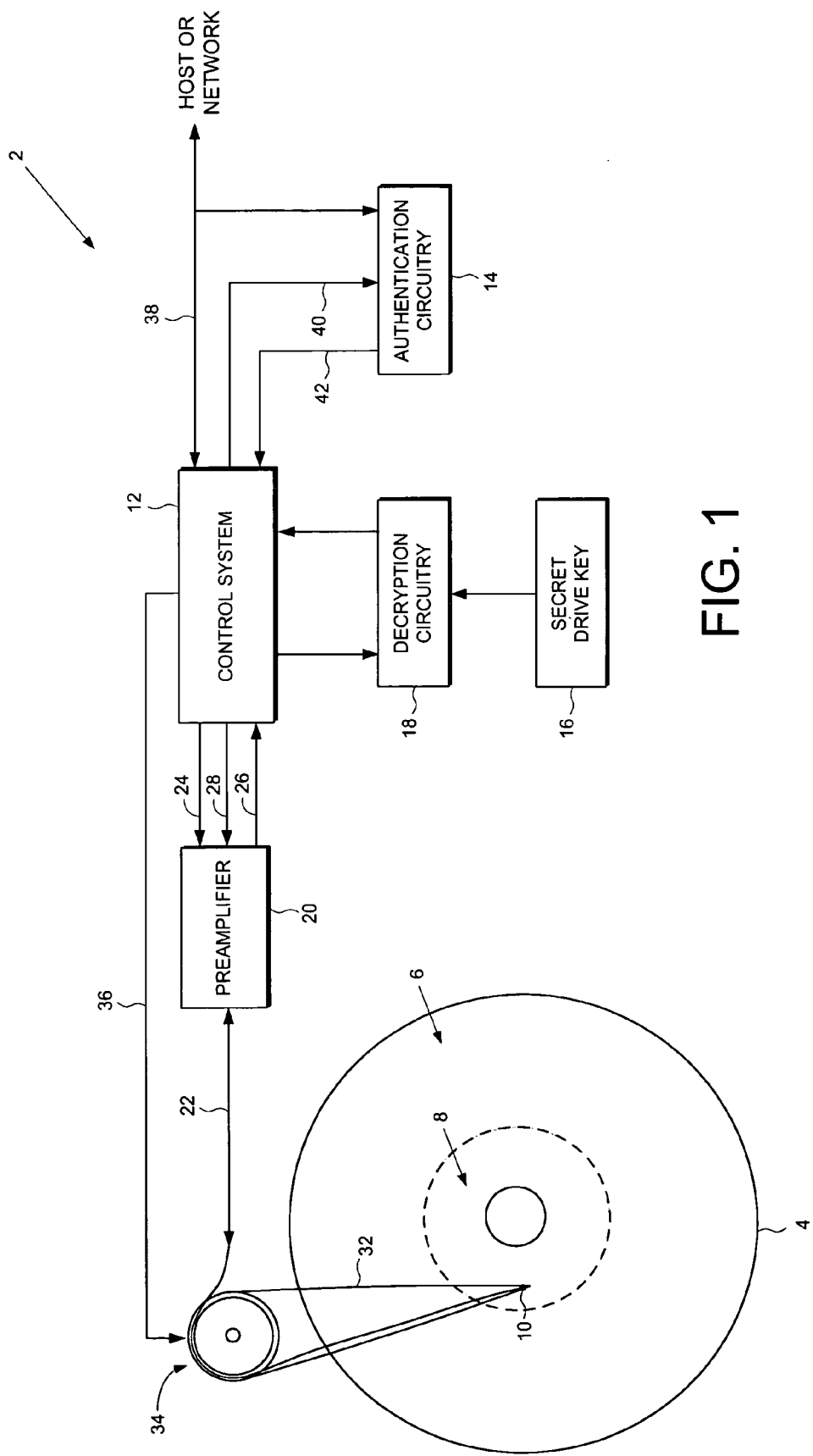
FIG. 1 shows a disk drive according to an embodiment of the present invention comprising a disk having a public area for storing plaintext data and a pristine area for storing encrypted data, decryption circuitry for decrypting the encrypted data, a secret drive key employed by the decryption circuitry, and authentication circuitry for authenticating requests by external entities to access the pristine area.

FIG. 1 shows a disk drive 2 according to an embodiment of the present invention comprising a disk 4 for storing data, the disk 4 comprising a public area 6 for storing plaintext data and a pristine area 8 for storing encrypted data. The disk drive 2 comprises a head 10 for reading the encrypted data from the pristine area 8 of the disk 4, and a control system 12 for controlling access to the pristine area 8 of the disk 4. Authentication circuitry 14 within the disk drive 2 is provided for authenticating a request received from an external entity to access the pristine area 8 of the disk 4 and for enabling the control system 12 if the request is authenticated. The disk drive 2 further comprises a secret drive key 16, and decryption circuitry 18 responsive to the secret drive key 16, for decrypting the encrypted data stored in the pristine area 8 of the disk 4.

In the embodiment of FIG. 1, the disk drive further comprises a preamplifier 20 for generating an analog write signal 22 supplied to the head 10 during a write operation and for receiving an analog read signal 22 from the head 10 during a read operation. The preamplifier 20 receives digital write data 24 from the control system 12 which is to be written to the disk 4, wherein the digital write data 24 modulates current in the analog write signal 22 and thus the head 10 in order to write a series of magnetic transitions on the surface of the disk 4 representing the recorded digital data. During a read operation, the head 10 senses the magnetic transitions which induces pulses in the analog read signal 22. The preamplifier 20 preamplifies the analog read signal 22 and the preamplified analog read signal 26 is supplied to the control system 12 where it is demodulated into an estimated data sequence representing the originally recorded data. In one embodiment, the control system 12 implements an error correction code (ECC) for use in detecting and correcting errors in the estimated digital data induced by the recording and reproduction process. The control system 12 sends control sequences to the preamplifier 20 over line 28 in order to configure it for write or read operations.

In the embodiment of FIG. 1, the head 10 is mounted on the distal end of an actuator arm 32 which is rotated about a pivot 34 by a voice coil motor (VCM not shown). The control system 12 comprises a servo control system for generating control signals 36 applied to the VCM in order to position the head radially over the disk 4 so as to access a desired area of the disk 4 during write and read operations. The control system 12 will access the pristine area 8 and allow a write or read operation only if certain predetermined conditions are satisfied.

In one embodiment of the present invention, the disk drive 2 receives requests from external entities (e.g., a host or client computer) to access the pristine area 8. The control system 12 allows the access only if the request is authenticated by the authentication circuitry 14. For example, the pristine area 8 may store sensitive information (e.g., a password, credit card number, etc.) for use in a secure transaction with an Internet web site. This information is stored in the pristine area 8 in encrypted form so that it cannot be discovered by an attacker evaluating the disk storage medium. In addition, the pristine area 8 is protected from access through normal operation of the disk drive 2 by requiring requests received from external entities to be authenticated.

When the control system 12 receives via line 38 a request from an external entity to access the pristine area 8 (read or write), it sends a command via line 40 to the authentication circuitry 14 to authenticate the request. The authentication circuitry 14 evaluates the request and, if authentic, sends a command via line 42 to enable the control system 12 to perform the request. In one embodiment of the present invention, the authentication circuitry 14 enables the servo control system within control system 12 to restrict access to the pristine area 8. Embedded servo sectors are recorded on the disk 4, wherein the embedded servo sectors comprise servo bursts used for servoing the head over the disk 4. In one embodiment, the servo sectors are recorded in unencrypted form in the pristine area 8 such that servoing the head 10 by reading the servo bursts is possible if the disk 4 is removed and placed in another disk drive or on a spin stand. In another embodiment, the servo bursts are recorded in the servo sectors of the pristine area 8 in encrypted form to protect against an attacker removing the disk 4 and attempting to servo using an external apparatus. In one embodiment, the servo bursts are encrypted by recording the servo bursts with additive noise generated from a pseudo random sequence. The pseudo random sequence is generated using a polynomial, and the authentication circuitry provides the polynomial to the control system 12 to enable the servo control system to servo in the pristine area 8. The additive noise in the servo bursts is subtracted from the read signal by regenerating the pseudo random sequence. In one embodiment, the polynomial for regenerating the pseudo random sequence is stored in encrypted form in the pristine area 8 of the disk 4, preferably in a physical block which is inaccessible to an external entity as described in greater detail below with reference to FIG. 4.

Figure 2:
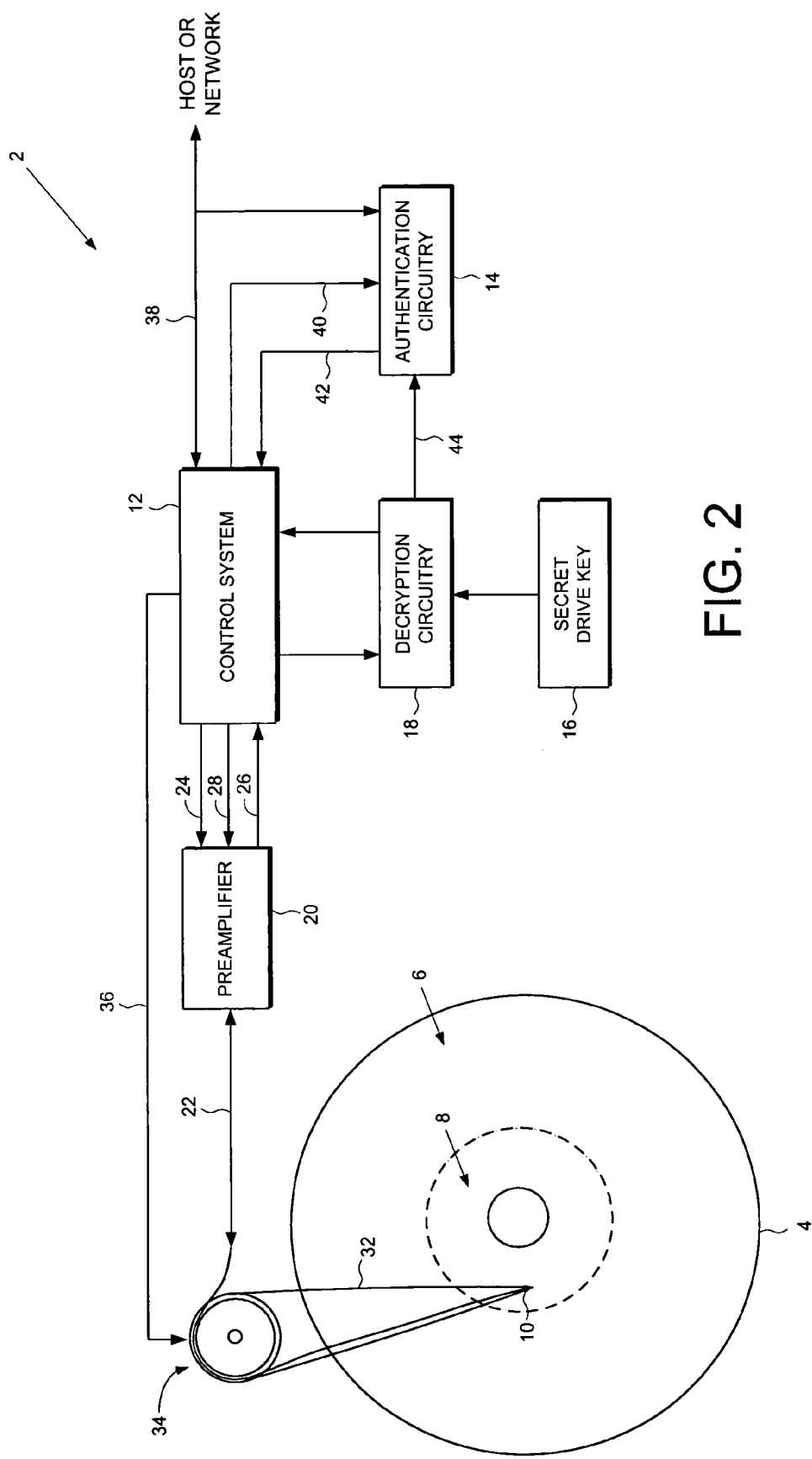
FIG. 2 shows a disk drive according to an embodiment of the present invention wherein the authentication circuitry is responsive to decrypted data generated by the decryption circuitry after decrypting the encrypted data stored in the pristine area of the disk.

In another embodiment of the present invention shown in FIG. 2, the authentication process is implemented using the encrypted data stored in the pristine area 8. The encrypted data is read from the disk 4 by the control system 12, decrypted by the decryption circuitry 18 using the secret drive key 16, and the decrypted data transferred over line 44 to the authentication circuitry 14.

The authentication circuitry 14 may perform user/device authentication, message authentication, or user/device as well as message authentication. With user/device authentication, the authentication circuitry 14 verifies that the request was sent from a trusted entity, and with message authentication, the authentication circuitry 14 verifies that the request was not modified while in transit from the external entity to the disk drive 2.

User/device authentication may be implemented, for example, by associating selected information (e.g., a password, finger print, voice print, spectral signature, etc.) with a trusted entity. In one embodiment, user/device authentication information (e.g., a password) is stored in the pristine area 8 of the disk 4. When an external entity sends a request to access to the pristine area 8, the request received over line 38 comprises an entity ID and an entity password. The authentication circuitry 14 uses the entity ID to read the associated password from the pristine area 8, and the request is authenticated if it matches the entity password received in the request. Otherwise, the request is not authenticated and access is denied.

The user/device authentication information (e.g., password) is stored in the pristine area 8 in encrypted form using a suitable encryption algorithm (e.g., DES, RSA, etc.) which may be symmetric (private key encryption) or asymmetric (public key encryption). The decryption circuitry 18 within the disk drive 2 uses the secret drive key 16 to decrypt the encrypted authentication information, and the decrypted authentication information is provided to the authentication circuitry 14 over line 44 (FIG. 2). A suitable means is employed to protect the secret drive key 16 from discovery, such as tamper resistant circuitry. In addition, all or part of the control system 12 and/or the authentication circuitry 14 may be implemented using tamper resistant circuitry to protect the decrypted authentication data. An example discussion of tamper-resistant circuitry is provided in Tygar, J. D. and Yee, B. S., "Secure Coprocessors in Electronic Commerce Applications," Proceedings 1995 USENIX Electronic Commerce Workshop, 1995, New York, which is incorporated herein by reference.

In the above referenced co-pending patent application entitled "SECURE DISK DRIVE COMPRISING A SECURE DRIVE KEY AND A DRIVE ID FOR IMPLEMENTING SECURE COMMUNICATION OVER A PUBLIC NETWORK," a nexus of secure disk drives are manufactured in a way that enables secure network communication between the drives. In one embodiment, each secure disk drive is manufactured with a secure drive key and a unique drive ID which are used for identification and authentication. When the network detects that one of the secure disk drives has been compromised, its drive ID is invalidated. Each secure disk drive in the nexus stores a list of invalidated drive IDs. If a secure disk drive receives a request from a disk drive with an invalid drive ID, the request is denied.

In one embodiment of the present invention, the list of invalidated drive IDs is stored in encrypted form in the pristine area 8 of the disk 4 within each secure disk drive. When a request is received over line 38 from a secure disk drive in the nexus, the list of invalidated drive IDs is read from the pristine area 8, decrypted by the decryption circuitry 18 using the secret drive key 16, and transmitted over line 44 (FIG. 2) to the authentication circuitry 14. The authentication circuitry 14 authenticates the secure disk drive (device) by comparing the drive ID received in the request to the list of invalidated drive IDs. In one embodiment, the list of invalidated drive IDs is encrypted according to a message authentication code to protect against attempts to modify the list, wherein the list itself is stored in unencrypted form. Thus, the term "encrypted data" as used herein includes encryption using a message authentication code.

The drive ID in each secure disk drive may also be stored in the pristine area 8 in encrypted form. When a secure disk drive generates a request, the drive ID is read from the pristine area 8, decrypted by the decryption circuitry 18 using the secret drive key 16, and appended to the request.

Figure 3:
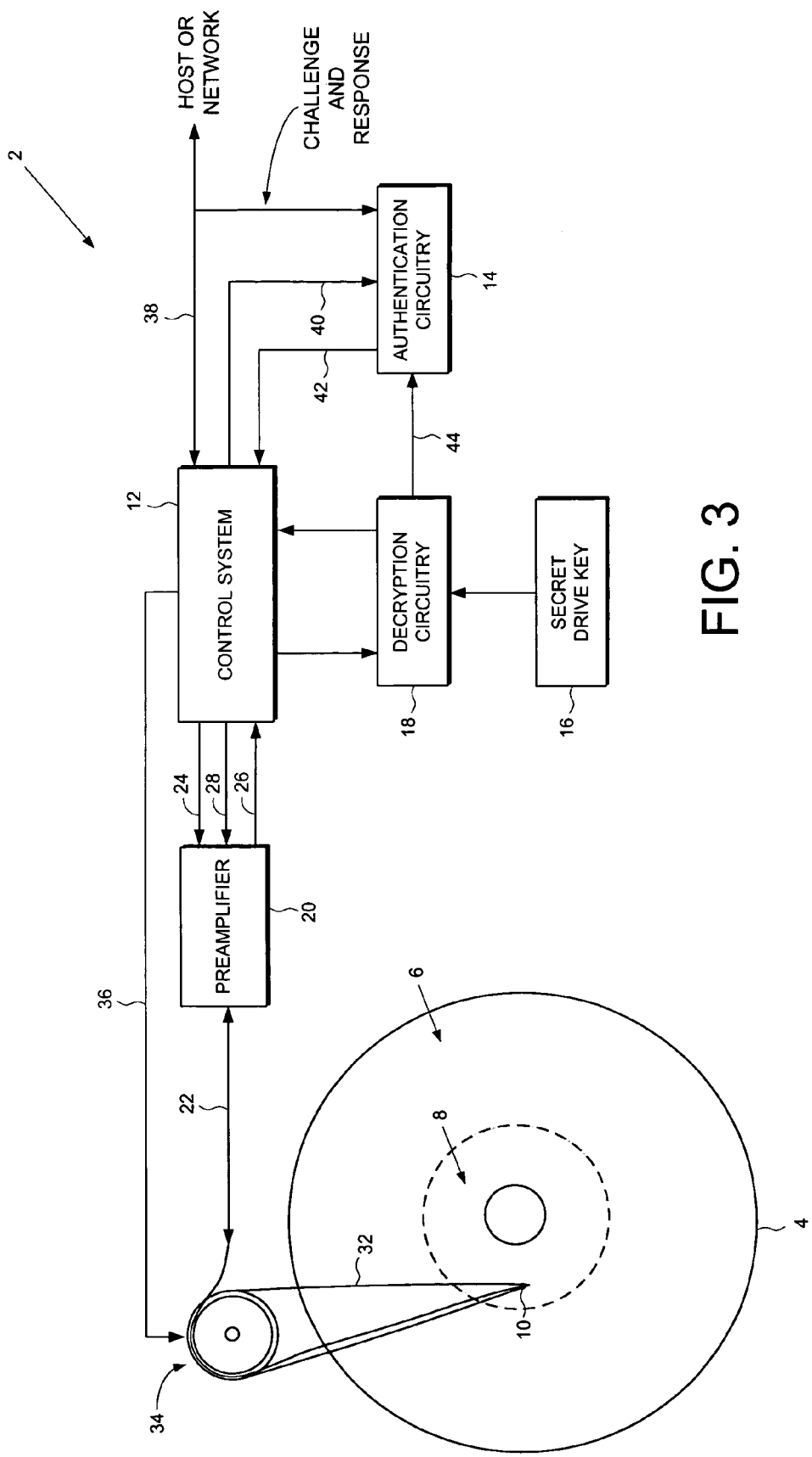
FIG. 3 shows an embodiment of the present invention wherein the authentication circuitry implements a challenge and response protocol in order to verify the authentication of a user or a device, wherein the pristine area on the disk is used to store data employed in the challenge and response protocol.

In an alternative embodiment of the present invention shown in FIG. 3, the pristine area 8 stores information used to implement a suitable challenge and response sequence. A challenge and response sequence is used to authenticate an external entity by sending a random challenge value to the external entity; the external entity is authenticated if it replies with the appropriate response value. In one embodiment, the pristine area 8 stores information used to generate the random challenge value sent to an external entity as well as information for verifying the response value received from the external entity. In another embodiment, the pristine area 8 stores information used to generate the response value for replying to a challenge received from an external entity. The challenge and response information is stored in encrypted form in the pristine area 8, decrypted by the decryption circuitry 18 using the secret drive key 16, and the decrypted data transferred to the authentication circuitry 14 over line 44.

The authentication circuitry 14 may also be used to authenticate a request (message) received from an external client to verify that the request was not modified while in transit. In one embodiment, a message authentication code (MAC) is generated and appended to the request. The request is then authenticated by regenerating the MAC and comparing the regenerated MAC to the MAC appended to the request. If the request has not been modified while in transit, the regenerated MAC will match the MAC appended to the request. Any suitable method may be employed to generate the MAC, for example, using a hashing function implemented with or without a secret key. The pristine area 8 is used to store information in encrypted form for use in generating the MAC, such as a hashing function and/or a secret key used with the hashing function. The MAC information is read from the pristine area 8, decrypted by the decryption circuitry 18 using the secret drive key 16, and transferred to the authentication circuitry 14 over line 44 (FIG. 2).

In another embodiment of the present invention, the pristine area 8 of the disk 4 stores an encrypted secret key for use in decrypting a message received over line 38 from an external entity. The encrypted secret key is read from the pristine area 8 and decrypted by the decryption circuitry 18 using the secret drive key 16. The decrypted secret key is then used by the decryption circuitry 18 to decrypt the message received over line 38. This embodiment may facilitate a distributed key management system for a network of computer devices.

In yet another embodiment of the present invention, the pristine area 8 of the disk 4 stores encrypted message data. An external entity (e.g., a host, client or server) may send a request to the disk drive 2 to store sensitive information (e.g., a credit card number) in the pristine area 8 in encrypted form. The information may already be encrypted before receipt by the disk drive 2, or it may be encrypted by the disk drive 2 before it is written to the pristine area 8. A subsequent request may then be sent to the disk drive 2 to read the encrypted message stored in the pristine area 8. The disk drive 2 will authenticate the request before allowing access to the pristine area 8, and optionally decrypt the message before transferring it to the external entity.

In another embodiment of the present invention, the disk drive 2 of FIG. 1 authenticates a request received from an external entity to access the public area 6 of the disk 4 (read or write). This embodiment provides additional protection in that all requests to access the disk 4, including requests to access the public area 6, must first be authenticated. As with the previously disclosed embodiments, this embodiment implements user/device authentication, and optionally message authentication, using encrypted authentication data stored in the pristine area 8 of the disk 4.

FIG. 4 illustrates another embodiment of the present invention wherein the disk 4 comprises a plurality of physical blocks accessed by the control system using physical block addresses. An access request received from an external entity during normal operation of the disk drive 2 comprises a logical block address which is mapped by the control system 12 to a selected one of the physical block addresses. The pristine area 8 comprises at least one physical block written with at least part of the encrypted data during manufacturing of the disk drive 2 and not externally accessible through a logical block address during normal operation of the disk drive 2.

Each entry in the table of FIG. 4 represents a physical block recorded on the disk 4, where the first 40 entries (0–39) are the physical blocks reserved for the pristine area 8 and the next 110 entries (40–149) are the physical blocks reserved for the public area 6. The first 20 physical bocks in the pristine area 8 are reserved for storing encrypted data which is inaccessible by external entities through a logical block address during normal operation of the disk drive 2. These physical blocks store encrypted data used internally by the disk drive 2, for example, encrypted authentication information for implementing a challenge and response verification sequence. The encrypted data is written to these physical blocks during manufacture of the disk drive 2 and accessed by the control system 12 using physical block addresses which are not mapped from logical block addresses. The next 20 physical blocks (20–39) in the pristine area 8 are reserved for storing encrypted data which is accessible only by trusted external entities through logical block addresses, that is, after having been authenticated by the authentication circuitry 14.

Partitioning the disk 4 into a public area 6 and a pristine area 8 improves the disk drive's performance. The disk drive's latency and throughput degenerate when accessing the pristine area 8 due to the overhead associated with the decryption circuitry 18 decrypting the encrypted data as it is read from the pristine area 8. However, there are typically fewer accesses to the pristine area 8 as compared to the public area 6. For example, authenticating a request received from an external entity may require only a few accesses to the pristine area 8, whereas the request itself may require multiple accesses (read or write) to the public area 6.

The pristine area 8 may be used to store plaintext data as well as encrypted data, and the public area 6 may be used to store encrypted data as well as plaintext data. For example, it may be desirable to store plaintext data in the pristine area 8 in order to restrict access to the data without degrading the performance of the disk drive. In another embodiment, it may be desirable to store encrypted data in the public area 6 when restricting access to the encrypted data is not a concern.

In another embodiment of the present invention, a plurality of computer devices, including a plurality of disk drives, are interconnected in a computer network and communicate through a network protocol. Each disk drive comprises a disk having a public area 6 for storing plaintext data and a pristine area 8 for storing encrypted data. Further, each disk drive implements one or more of the aspects described above with respect to restricting access to the pristine area 8, storing encrypted authentication data in the pristine area 8, or partitioning the pristine area 8 into a number of physical blocks accessible by external entities and a number of physical blocks inaccessible by external entities.

The invention claimed is:

1. A disk drive comprising:
   (a) a disk for storing data including embedded servo sectors comprising servo bursts, the disk comprising a public area for storing plaintext data and a pristine area for storing encrypted data;
   (b) a head for reading the encrypted data from the pristine area of the disk;
   (c) a control system for interfacing with a host computer to facilitate read and write commands to write data to and read data from the pristine area of the disk, the control system comprising:

authentication circuitry for authenticating a request received from the host computer to access the pristine area of the disk;

a secret drive key;

decryption circuitry, responsive to the secret drive key, for decrypting the encrypted data stored in the pristine area of the disk to generate decrypted data; and a servo control system responsive to the embedded servo sectors:

wherein:

the servo bursts are written to the disk in encrypted form; and the authentication circuitry enables the servo control system to decrypt the servo bursts.

2. The disk drive of claim 1, wherein the encrypted data comprises encrypted authentication data.

3. The disk drive of claim 2, wherein the authentication circuitry is responsive to the decrypted data.

4. The disk drive of claim 2, wherein the encrypted authentication data comprises encrypted user authentication data.

5. The disk drive of claim 2, wherein the encrypted authentication data comprises encrypted device authentication data for authenticating a device, the device comprising a unique device ID configured during manufacture of the device.

6. The disk drive of claim 2, wherein the encrypted authentication data comprises encrypted information for implementing a challenge and response verification sequence.

7. The disk drive of claim 2, wherein the encrypted authentication data comprises encrypted message authentication data.

8. The disk drive of claim 7, wherein the encrypted authentication data comprises encrypted key data for generating a message authentication code.

9. The disk drive of claim 1, wherein the encrypted data comprises encrypted key data for decrypting an encrypted message.

10. The disk drive of claim 1, wherein the encrypted data comprises encrypted message data.

11. The disk drive of claim 1, wherein the disk drive further comprises encryption circuitry for encrypting plaintext data into the encrypted data stored in the pristine area.

12. The disk drive of claim 1, wherein:

(a) the servo bursts are written to the disk with additive noise generated from a pseudo random sequence;

(b) the pseudo random sequence is generated from a polynomial;

(c) the servo control system uses the polynomial to decrypt the servo bursts; and (d) the authentication circuitry provides the polynomial to the servo control system.

13. A method of processing a request received by a disk drive from a host computer to access encrypted data stored in a pristine area of a disk, wherein the disk further comprises embedded servo sectors comprising servo bursts, the method comprising the steps of:

(a) using a control system internal to the disk drive to receive the request from the host computer;

(b) using the control system internal to the disk drive to authenticate the request to access the pristine area and to enable access to the pristine area if the request is authenticated;

(c) using the control system internal to the disk drive to read the encrypted data stored in the pristine area;

(d) using the control system internal to the disk drive to decrypt the encrypted data using a secret drive key within the disk drive to generate decrypted data;

(e) using the control system internal to the disk drive to servo a head over the disk in response to the embedded servo sectors; and (f) using the control system internal to the disk drive to enable servoing in the pristine area if the request is authenticated, wherein:

the servo bursts are written to the disk in encrypted form; and the step of authenticating the request to access the pristine area comprises the step of decrypting the servo bursts.

14. The method as recited in claim 13, wherein the encrypted data comprises encrypted authentication data.

15. The method as recited in claim 14, wherein the step of authenticating is responsive to the decrypted data.

16. The method as recited in claim 14, wherein the encrypted authentication data comprises encrypted user authentication data.

17. The method as recited in claim 14, wherein the encrypted authentication data comprises encrypted device authentication data for authenticating a device, the device comprising a unique device ID configured during manufacture of the device.

18. The method as recited in claim 14, wherein the encrypted authentication data comprises encrypted information for implementing a challenge and response verification sequence.

19. The method as recited in claim 14, wherein the encrypted authentication data comprises encrypted message authentication data.

20. The method as recited in claim 19, wherein the encrypted authentication data comprises encrypted key data for generating a message authentication code.

21. The method as recited in claim 13, wherein the encrypted data comprises encrypted key data for decrypting an encrypted message.

22. The method as recited in claim 13, wherein the encrypted data comprises encrypted message data.

23. The method as recited in claim 13, further comprising the step of encrypting plaintext data to generate the encrypted data stored in the pristine area.

24. The method as recited in claim 13, wherein:

(a) the servo bursts are written to the disk with additive noise generated from a pseudo random sequence;

(b) the pseudo random sequence is generated from a polynomial; and (c) the step of servoing uses the polynomial to decrypt the servo bursts.

25. A method of processing a request received by a disk drive from a host computer to access data stored on a disk, the disk comprising a public area for storing plaintext data and a pristine area for storing encrypted data, the disk further comprises embedded servo sectors comprising servo bursts, the method comprising the steps of:

(a) using a control system internal to the disk drive to receive the request from the host computer;

(b) using the control system internal to the disk drive to decrypt the encrypted data stored in the pristine area of the disk using a secret drive key within the disk drive to generate decrypted data;

(c) using the control system internal to the disk drive to process the decrypted data to authenticate the request received from the host computer before allowing access to the disk;

(d) using the control system internal to the disk drive to servo a head over the disk in response to the embedded servo sectors; and (e) using the control system internal to the disk drive to enable servoing in the pristine area if the request is authenticated, wherein:

the servo bursts are written to the disk in encrypted form; and the step of authenticating the request to access the pristine area comprises the step of decrypting the servo bursts.

26. A disk drive comprising a disk for storing data including embedded servo sectors comprising servo bursts, and a head for reading data from the disk, the improvement comprising:

a control system for interfacing with a host computer to facilitate read and write commands to write data to and read data from the disk, the control system comprising:

authentication circuitry for authenticating a request received from the host computer to access the disk;

a secret drive key;

decryption circuitry, responsive to the secret drive key, for decrypting the encrypted data stored on the disk to generate decrypted data; and a servo control system responsive to the embedded servo sectors;

wherein:

the servo bursts are written to the disk in encrypted form; and the authentication circuitry enables the servo control system to decrypt the servo bursts.

* * * * *